(No Model.)
J. R. NOBLE & J. D. BULLOCK.
GAG AND MUZZLE.
No. 325,434. Patented Sept. 1, 1885.
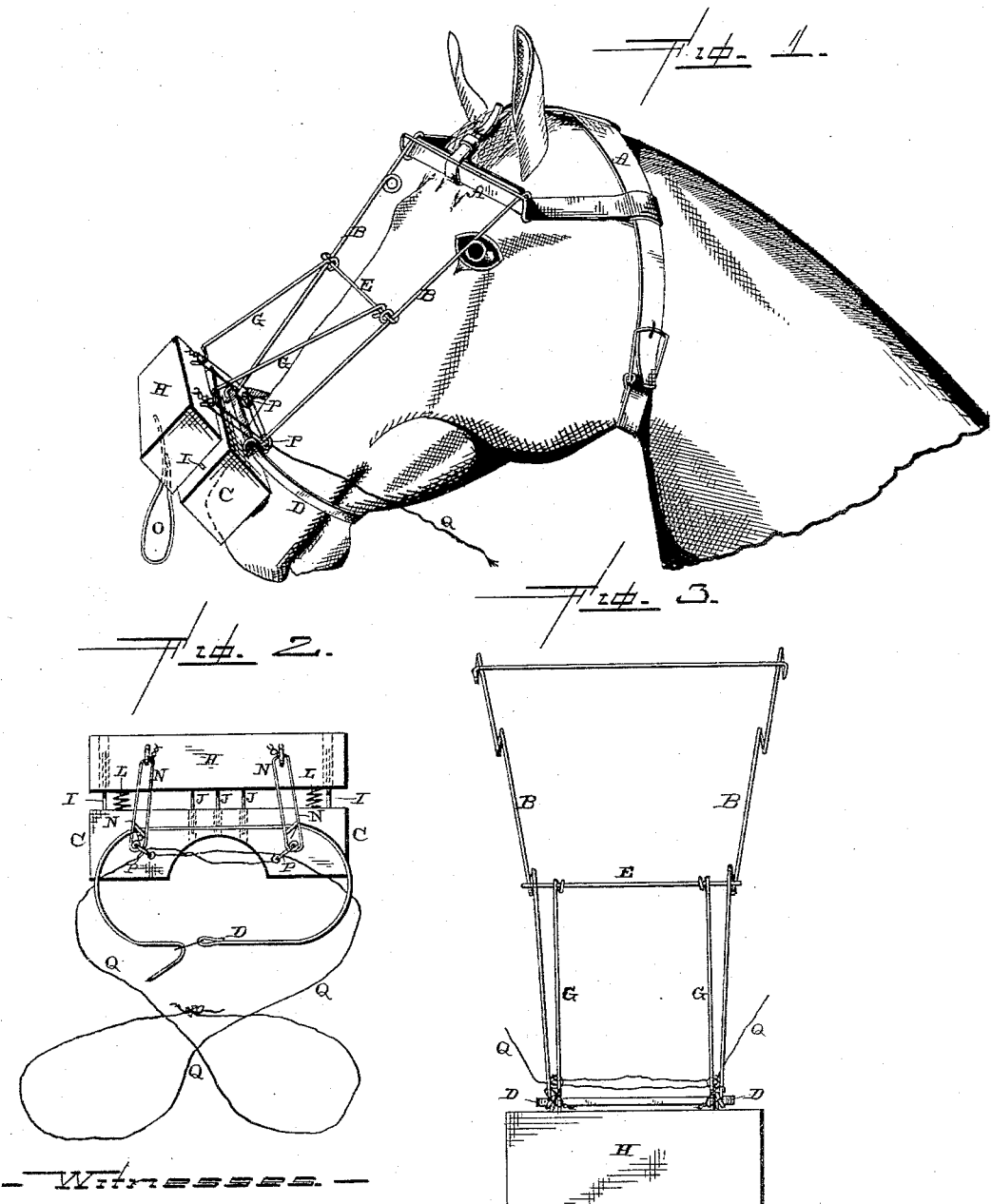

UNITED STATES PATENT OFFICE.

JOHN ROBERT NOBLE AND JEFF DAVIS BULLOCK, OF RIPLEY, MISSISSIPPI.

GAG AND MUZZLE.

SPECIFICATION forming part of Letters Patent No. 325,434, dated September 1, 1885.

Application filed May 21, 1885. (No model.)

*To all whom it may concern:*

Be it known that we, JOHN ROBERT NOBLE and JEFF DAVIS BULLOCK, of Ripley, in the county of Tippah and State of Mississippi, have invented certain new and useful Improvements in Gags and Muzzles; and we do hereby declare the following to be a full, clear, and exact description of the invention, such as will enable others skilled in the art to which it pertains to make and use it, reference being had to the accompanying drawings, which form part of this specification.

Our invention relates to improvements in gags and muzzles; and it consists in, first, the combination of a suitable headstall for attaching the device to the animal's head, a metallic frame which is attached to the headstall and which has fastened to its lower end a perforated block which fits over the animal's nose, a second block which is supported upon the metallic frame and which is provided with sharp points which pass through the inner block and which press on the animal's nose, springs for keeping the outer block pressed outward, loops for controlling the movement of the outer block, and a strap for holding the inner plate in contact with the animal's nose; and, second, the combination of the two blocks, which are connected together by means of a metallic frame which is attached to the front of the animal's head, loops for controlling the movement of the outer block, a strap for fastening the inner block in contact with the animal's nose, and cords passing between the animal's front legs and up around the body, all of which will be more fully described hereinafter.

The object of our invention is to provide an attachment for the heads of animals, which will prevent the large ones from either jumping or throwing down the rails of a fence, and which will prevent a cow either from sucking itself or prevent colts and calves from sucking when it is desired to wean them.

Figure 1 is a side elevation of a device embodying our invention complete. Fig. 2 is a plan view of the same, the upper portion of the frame and headstall being removed. Fig. 3 is a front view.

A represents a headstall or strap of any kind, and by means of which our attachment is fastened to the front of an animal's head. We do not limit ourselves to any particular construction of strap or fastening devices which are to be applied to the animal's head, for these may be varied in many ways. Fastened to this headstall A is a metallic frame, B, which is made of a length proportioned to the size of the animal to which it is to be applied, and to the lower end of which is rigidly fastened the inner block, C. This block has a number of perforations made through it, and is recessed on its inner side at that point where it rests against the animal's nose. The perforations for the prickers are made through this recess or cut-away part of the block, so that the prickers will come in contact with the animal's nose. This inner block, C, is held in position upon the animal's nose by means of a strap, D, which is connected to the frame B, which passes around and is fastened under the animal's jaw.

Attached to the frame B at any suitable point is a cross-bar, E, which connects the opposite sides of the frame together, and thus braces and strengthens them. Loosely connected to this cross-bar are rods G, to the lower ends of which is secured the outer block, H. This outer block, H, is the size of the inner one, C, and is held in a line therewith by means of the guiding-rods I, which project from the inner block and pass through the outer one. To this outer block are secured a number of prickers, J, which pass through the perforations in the inner block for the purpose of pricking the animal upon the nose whenever an attempt is made to either jump or throw down the rails of fences.

Between the two blocks are placed spiral springs L, which serve to keep the outer block pressed outward, so that the prickers will not be brought in contact with the animal's nose until the pressure is applied to the outer block for the purpose of forcing it inward toward the animal's nose. The distance this outer block is forced outward from the inner one by means of the springs is limited by the loops N, which are passed around both the frame and the rods to which the outer block is fastened.

Secured to the under side of the outer block is a bent rod, O, which extends outward a suitable distance, and which serves to catch against the fence whenever the animal approaches it or attempts to put its head over.

This bent rod or wire catches against the top of the fence and causes a direct backward pressure upon the block, for the purpose of forcing the prickers into the animal's nose. Where it is simply desired to prevent colts or calves from sucking or to prevent a cow from sucking herself, the above-described parts are all that are necessary. The bent rod which projects from the outer block may also be dispensed with if so desired.

When the animal is addicted to jumping fences, rings P are attached to the inner ends of the loops, and passed through these loops in opposite directions are the ropes or cords Q, which are passed in between the front legs of the animal, and are then passed up over the sides of the animal and fastened over the back. By means of these cords the animal can be prevented from raising its head beyond a certain point, and in this manner prevent it from raising its head as high as the top of the fence. Should the animal attempt to raise its head, as in the act of jumping, the cords draw the outer block backward, so as to force the prickers into the animal's nose.

Having thus described our invention, we claim—

1. The combination of the strap or headstall, the frame B, attached to the strap, and the inner block, C, secured to the lower end of the frame and provided with guides and perforations, with the outer block attached to the frame by connecting-rods, the prickers attached to the outer block, the springs placed between the two blocks, the loops for limiting the movement of the outer block, and the strap for holding the inner block in position upon the animal's nose, as shown.

2. The combination of the two blocks separated from each other by springs, one of which is provided with pricking devices, frames for supporting the blocks in position, loops for controlling the movement of the outer block, the strap for securing the inner block in position upon the nose, and the ropes or cords which are connected to the loops, and are adapted to be fastened around the animal's body, substantially as set forth.

In testimony whereof we affix our signatures in presence of two witnesses.

JOHN ROBERT NOBLE.
JEFF DAVIS BULLOCK.

Witnesses:
N. L. MARMON,
J. H. DALTON.